US012683039B2

(12) United States Patent
Rosenberger et al.

(10) Patent No.: US 12,683,039 B2
(45) Date of Patent: Jul. 14, 2026

(54) WIRING HARNESS AND ELECTRICAL ASSEMBLY HAVING A WIRING HARNESS

(71) Applicant: Bayerische Motoren Werke Aktiengesellschaft, Munich (DE)

(72) Inventors: Maximilian Rosenberger, Munich (DE); Thomas Spiess, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 222 days.

(21) Appl. No.: 18/684,955

(22) PCT Filed: Aug. 24, 2022

(86) PCT No.: PCT/EP2022/073530

§ 371 (c)(1),
(2) Date: Feb. 20, 2024

(87) PCT Pub. No.: WO2023/046395

PCT Pub. Date: Mar. 30, 2023

(65) Prior Publication Data

US 2025/0132069 A1 Apr. 24, 2025

(30) Foreign Application Priority Data

Sep. 27, 2021 (DE) ..................... 10 2021 124 836.1

(51) Int. Cl.
*H01B 7/285* (2006.01)
*H01B 7/00* (2006.01)

(52) U.S. Cl.
CPC ......... *H01B 7/0072* (2013.01); *H01B 7/0045* (2013.01); *H01B 7/285* (2013.01)

(58) Field of Classification Search
CPC ..... H01B 7/0072; H01B 7/0045; H01B 7/285
(Continued)

(56) References Cited

U.S. PATENT DOCUMENTS 6,239,363 B1 * 5/2001 Wooters .................... F16L 1/14 174/101.5
2004/0108125 A1 * 6/2004 Thomassen ............. F16L 53/35 174/8

(Continued)

FOREIGN PATENT DOCUMENTS

CN 204391986 U 6/2015
DE 10 2005 040 804 A1 3/2007

(Continued)

OTHER PUBLICATIONS

International Search Report (PCT/ISA/210) issued in PCT Application No. PCT/EP2022/073530 dated Feb. 27, 2023 with English translation (9 pages).

(Continued)

*Primary Examiner* — Timothy J Thompson
*Assistant Examiner* — Michael F Mcallister
(74) *Attorney, Agent, or Firm* — Crowell & Moring LLP

(57) ABSTRACT

A wiring harness and an electrical assembly in which a chamber can be vented by the wiring harness are provided. The wiring harness is configured to transmit electrical power between two electrical contact points located separate from each other. The wiring harness includes an individual conductor, which includes an electrically insulating layer and forms, along a longitudinal direction of extent of the wiring harness, two connection ends of the wiring harness for electrically contacting the contact points; a hollow channel element, which is separate from the individual conductor and runs along the longitudinal direction of extent, wherein each of the ends of the channel element opens out at a respective connection end; and a wiring harness sheath, by way of which the individual conductor and the channel element are jointly sheathed along the longitudinal direction of extent.

12 Claims, 2 Drawing Sheets

(58) Field of Classification Search
USPC ........................................................... 174/47
See application file for complete search history.

(56) References Cited

U.S. PATENT DOCUMENTS

| | | | | |
|---|---|---|---|---|
| 2009/0167078 | A1* | 7/2009 | Watanabe ................ | H01B 7/16<br>307/10.1 |
| 2011/0005806 | A1 | 1/2011 | Vexler et al. | |

FOREIGN PATENT DOCUMENTS

| | | | |
|---|---|---|---|
| DE | 10 2013 200 894 | A1 | 7/2014 |
| DE | 10 2017 128 532 | B4 | 10/2019 |
| DE | 10 2018 212 157 | A1 | 1/2020 |
| WO | WO 2006/114276 | A1 | 11/2006 |
| WO | WO 2009/010899 | A2 | 1/2009 |

OTHER PUBLICATIONS

German-language Written Opinion (PCT/ISA/237) issued in PCT Application No. PCT/EP2022/073530 dated Feb. 27, 2023 with English translation (15 pages).
German-language Search Report issued in German Application No. 10 2021 124 836.1 dated May 17, 2022 with partial English translation (12 pages).

* cited by examiner

WIRING HARNESS AND ELECTRICAL ASSEMBLY HAVING A WIRING HARNESS

BACKGROUND AND SUMMARY

The present invention relates to a wiring harness for an electrical assembly, in particular of a motor vehicle. The invention also relates to an electrical assembly that has the wiring harness.

In the case of electrical assemblies, for example electrical drive units, which have an electric machine (for example as a traction machine), it often happens that a chamber, for instance the machine chamber, of the electrical assembly is fluidically sealed off from a region outside the chamber, although a machine element, for instance a shaft etc., extends from an interior of the chamber into the outside region. For example, a rotor shaft extends out of a stator chamber into the region outside the stator chamber, for example into a brush chamber of the electric machine, the stator chamber and the brush chamber being fluidically sealed off from one another along the rotor shaft. This is required in particular whenever the stator chamber contains a cooling liquid, which means that an electric machine formed in such a way is then a so-called wet rotor machine. To avoid cooling liquid undesirably escaping from the stator chamber, for instance entering the brush chamber, a radial shaft seal is used along the rotor shaft on a wall element of the stator chamber through which the rotor shaft extends. In order to keep this radial shaft seal as free from axial forces as possible, so that a particularly reliable sealing effect is ensured by way of the radial shaft seal, it is required not to allow an overpressure or underpressure which acts axially, that is to say along the rotor shaft, on the radial shaft seal in a disadvantageous way to occur in the corresponding chamber, that is to say for example in the stator chamber, with respect to the outside region (for example with respect to the brush chamber). If a motor vehicle is equipped with such a conventional drive unit or with such a conventional electrical assembly or machine, in may happen for example that air in the chamber is heated or cooled, for example as a result of waste heat occurring during operation of the electric machine or as a result of external cooling of the electric machine, for example due to operating in fording mode. According to the laws of thermodynamics, this results in a change in pressure in the chamber and consequently a pressure difference between the chamber and the associated outside region. There is for example a pressure difference between the stator chamber and the brush chamber. This is accompanied by undesired axial loading of the radial shaft seal and ultimately a reduced or less reliable sealing effect for the shaft seat of the chamber.

To overcome this problem, DE 10 2013 200 894 A1 for example discloses a housing of a generator that has a plug socket and a pressure equalizing channel. The pressure equalizing channel connects an interior space of the generator to a wiring harness which is inserted into the plug socket and also serves for equalizing the pressure, with respect to the outside. However, combining the plug socket with the pressure equalizing channel involves particularly great effort and a sealing effect is dependent on a correct fit of a plug element in the plug socket. Moreover, such a generator housing with the plug socket and also the wiring harness are not easy to handle for production-vehicle construction, are expensive and require a particularly great amount of installation space outside the generator, whereby an ever-present packaging issue in vehicle construction is further exacerbated.

DE 10 2017 128 532 B4 discloses a cable with an electrical conductor which is encapsulated in an insulating material of the cable and is surrounded by an electrically insulating and vapor-impermeable outer sheath of the cable. Arranged at one point of the cable is a semipermeable membrane, which is permeable to air and water vapor, the outer sheath having clearances in the region of the membrane, so that venting of the cable is ensured by way of the membrane. Such a conventional cable however involves particularly great effort with regard to production, operation and handling, since the semipermeable membrane can be damaged particularly easily, so that liquid can come into direct electrical contact with the electrical conductor through the defective/damaged membrane. This would result in a short circuit.

Furthermore, nowadays in vehicle construction it is necessary to comply with customer requirements and statutory specifications, for instance a desired fording depth and a standardized seal-tightness of elements of the drive unit (IP-7 waterproofness test). However, these requirements/specifications lead to conflicts of objectives with regard to an efficient possibility for pressure equalization or for venting the chamber mentioned at the beginning. It is known to place a venting opening of the chamber above a height specified for the desired fording depth, so that during fording as intended the water cannot reach the opening.

In waterproofness testing, the component to be tested has to be completely immersed at one and the same time, so that arranging the venting opening above the specified height is futile. Instead, float valves or a combination of one-way valves and membranes are then used at the openings.

The object of the invention is to provide a possibility for efficient pressure equalization of a chamber in which at least one electrical contact point is arranged that involves as little effort as possible.

This object is achieved by the subject matter of the claimed invention.

According to embodiments of the invention, a wiring harness for an electrical assembly is proposed. The wiring harness is designed for transmitting electrical power between two electrical contact points arranged separately from one another. In this case, the wiring harness has an individual conductor, which comprises an electrically insulating layer, in particular at least two such individual conductors, the individual conductor forming along a longitudinal direction of extent of the wiring harness at least two connection ends of the wiring harness for the electrical contacting of the contact points.

The respective individual conductor has a core of an electrically conducting or electrically conductive material. The core of the respective individual conductor may be formed from a plurality of electrically conducting wires or have just one electrically conductive wire. In any case, the respective individual conductor is fluidically seal-tight along its longitudinal direction of extent. This means that the respective individual conductor is blocked against a fluid flowing through it, for example in that there is a material-bonding connection between the one single wire and the electrically insulating layer and/or in that the electrically insulating layer is fluidically sealed off at its ends, for instance by way of a wire end sleeve. The wire end sleeve may have a cable lug in electrically conducting contact with the core.

The respective connection end is an end region of the wiring harness at which the wiring harness ends along the longitudinal direction of extent. The wiring harness has for each individual conductor at least two electrical connection elements, a respective one of the connection elements being arranged at a respective one of the connection ends. The wiring harness may also have a number of harness branches, so that the wiring harness has three, four, five etc. connection ends.

The wiring harness has furthermore a hollow channel element, which is formed separately from the (respective) individual conductor and runs along the longitudinal direction of extent, for instance parallel to the individual conductor or to the individual conductors, a respective one of the ends of the channel element opening out at a respective one of the connection ends. The channel element may be formed according to a topology of the wiring harness. This means that the channel element may have a number of channel branches, the respective channel branch being arranged so as to follow a corresponding one of the harness branches. The wiring harness may also have at least one further channel element.

Moreover, the wiring harness has a wiring harness sheath, by way of which the individual conductor(s) and the channel element or the channel elements are jointly sheathed along the longitudinal direction of extent—in particular uninterruptedly along the longitudinal direction of extent. For example, a material-bonding connection is established between the wiring harness sheath and the individual conductor or the individual conductors and the channel element or the channel elements, so that the wiring harness—apart from the hollow channel element—is blocked against a fluid, in particular air, flowing through it.

Being of a hollow form allows the channel element to offer a pressure equalizing channel which is free from material and can be flowed through by a fluid, in particular gas, for example air, and by way of which a pressure equalization can take place between the first connection end and the second connection end. In an advantageous way, the wiring harness therefore has a dual functionality, to be specific—firstly—the wiring harness is used as intended for transmitting the electrical power between the contact points and—secondly—the wiring harness, in particular the channel element, acts as a pressure equalizing element between the connection ends of the wiring harness. In addition, the channel element can advantageously be used particularly easily, in particular in the course of laying the wiring harness for forming an electrical network, since the channel element is an integral part of the wiring harness. This is advantageous in particular whenever a pressure equalizing element is to be formed subsequently, that is to say for example after a chamber or machine chamber has already been produced. Therefore, because of the wiring harness described herein and because of the channel element that forms the pressure equalizing channel, there is the possibility of retrofitting an already existing chamber with a pressure equalizing element, to be specific the channel element. Moreover, the wiring harness can be produced or has been produced particularly easily and involving little effort, in that the channel element is treated like an individual conductor. To produce the wiring harness, the channel element may for example be inserted together with the corresponding individual conductor or the individual conductors into a production device, for example into a wiring harness machine, by way of which the channel element and the individual conductors are then connected, for example intertwined with one another and/or wrapped around one another, and/or jointly sheathed with a further sheathing element.

According to a development of the wiring harness, it is provided that one, some or all of the channel elements has/have a dirt trapping device. Because of the dirt trapping device, it is effectively prevented that during pressure equalization between the connection ends of the wiring harness dirt is transported from one of the connection ends to the corresponding other of the connection ends. For example, the wiring harness may be used to connect one chamber of the electrical assembly and a further chamber of the electrical assembly fluidically to one another, so that a pressure equalization is established or can be established between the chambers by way of the channel element. By way of the dirt trapping device of the channel element it is in this case ensured that particles, in particular dirt particles, are not undesirably transported out of the one chamber into the other chamber. This is of particular advantage whenever the two chambers fluidically connected to one another by way of the wiring harness have to meet different requirements for technical cleanliness. For example, one chamber, in which a machine element, for instance a shaft, rotates as intended, may be fluidically connected by way of the wiring harness, in particular by way of the channel element, to an electronics chamber, in which control electronics or the like are accommodated. While the chamber in which the machine element moves, for example rotates, during operation is insensitive with regard to contamination, no dirt, in particular no electrically conducting dirt, is permitted to enter the chamber with the control electronics, since that would lead to a short-circuit of the control electronics. It is ensured by the dirt trapping device of the channel element that no dirt from the chamber with the rotating machine element, for example friction particulates from the rotating shaft and/or from corresponding bearings, gets into the chamber with the control electronics.

In a development of the wiring harness, one, some or all of the dirt trapping devices has/have a dirt trapping layer arranged on the inner circumferential side of the corresponding channel element. The dirt trapping layer may be for example a material layer corresponding to dirt particles to be expected, for example a magnetic and/or magnetizable material layer in order to capture metallic, in particular electrically conductive or conducting, dirt particles. In this way, undesired transport of these electrically conducting or metallic dirt particles between the connection ends of the wiring harness is effectively prevented. It may be provided that the dirt trapping device, in particular the dirt trapping layer, is an integral part of the corresponding channel element. For example, the dirt trapping layer may completely or partially form an inner surface of the corresponding channel element. Here, the dirt trapping device, in particular the dirt trapping layer, may extend over an entire length of the channel element or just some portions along the entire length of the channel element.

As an alternative or in addition, the dirt trapping layer may be adhesively formed on the inner circumferential side of the channel element in order to trap and/or capture non-magnetic or non-magnetizable dirt particles. Furthermore, because of the dirt trapping device, in particular because of the dirt trapping layer, the channel element may have on the inner circumferential side a trapping surface structure, which is formed for example like a hook tape of a hook-and-loop fastener. In this way it is ensured particularly reliably that corresponding dirt particles are trapped by interlocking and/or frictional engagement and are not undesirably transported between the connection ends, that is to say in particular between the two chambers that are fluidically connected to one another by the wiring harness during the operation or use of the wiring harness.

A further refinement of the wiring harness provides that one, some or all of the channel elements has/have an additional length portion, because of which the corresponding channel element or the corresponding channel elements is/are arranged as wrapping helically around the (respective) individual conductor in the wiring harness sheath, at least in a wrapping region. In this way the wiring harness is particularly stably formed, since the respective individual conductor and/or the channel element can thus be subjected to particularly high tensile loading before the corresponding individual conductor or the channel element can be pulled out of the remaining wiring harness, that is to say out of the wiring harness sheath, along the longitudinal direction of extent.

With regard to the dirt trapping device, it is provided in this connection—according to a development of the wiring harness—that one, some or all of the dirt trapping devices has/have the additional length portion. In this way a particularly long dirt trapping distance is advantageously obtained, this dirt trapping distance being longer because of the channel element wrapping helically around the (respective) individual conductor, at least longer by the extent of the length of the additional length portion, than a cable section that is bridged by the wiring harness during the use or operation of the wiring harness between the electrical contact points. Consequently, the additional length portion has a dual functionality, to be specific—firstly—it is advantageously made possible by the additional length portion that the corresponding channel element is arranged, at least in some portions, that is to say at least in the wrapping region, in such a way that the channel element wraps helically around one or more of the individual conductors. Secondly, the additional length portion acts at least as part of the dirt trapping device.

In a development, the wiring harness has an embedding body, which is arranged in the wiring harness sheath and in which the individual conductor(s) and the channel element or the channel elements are embedded—in particular in each case in a material-bonding manner. As a result, the wiring harness is fluidically seal-tight within the wiring harness sheath beyond the channel element along the longitudinal direction of extent. In other words, because of the embedding body, which may be provided as an alternative or in addition to the wire end sleeves or the material-bonding connection between the core of the respective individual conductor and the electrically insulating layer of the respective individual conductor, the wiring harness is blocked against a fluid, in particular air, flowing through it along the longitudinal direction of extent. Furthermore, the embedding body imparts stability and/or resistance to bending to the wiring harness, so that, because of the embedding body, the wiring harness is particularly stably formed. The embedding body is in particular sheathed by the wiring harness sheath, so that ultimately the embedding body, the at least one channel element and the at least one individual conductor are jointly sheathed by way of the wiring harness sheath.

It generally applies to the wiring harness that its elements or component parts are elastically and/or plastically bendable non-destructively along the longitudinal direction of extent. Expressed a different way, at least the respective individual conductor, its electrically insulating layer, the channel element or the channel elements and the wiring harness sheath are elastically and/or plastically bendable non-destructively along the longitudinal direction of extent. In particular, the embedding body is also elastically and/or plastically bendable non-destructively along the longitudinal direction of extent. In order to avoid the channel element being undesirably deformed in such a way as to hinder or block the fluid, in particular the air, flowing through the channel element or the pressure equalizing channel because of bending of the wiring harness, for example during assembly of the same, according to a development of the wiring harness it is provided that the channel element has a form stability structure by way of which the channel element is protected from excessive axial and radial deformation. In this way the channel element is effectively protected from buckling and/or crushing. In this case, the form stability structure is in particular elastically and/or plastically bendable non-destructively along the longitudinal direction of extent.

The form stability structure is for example a geometrical form of the cross-sectional figure of the channel element that has particularly high resistance to bending along the longitudinal direction of extent. The respective channel element may for example have a circular ring-shaped cross-sectional figure, a cross-sectional figure formed like a hollow polygon, in particular a triangle, a rectangle or a square etc. In particular, because of the form stability structure, the channel element has a deformation behavior during bending that is identical or at least similar to the individual conductor(s) and/or the further component parts of the wiring harness.

In a development of the wiring harness, it may be provided—in particular in spite of the possibly present additional length portion—that the individual conductor(s) project(s) beyond the channel element at the connection ends along the longitudinal direction of extent. For example, the channel element, and as a consequence the pressure equalizing channel, ends at a different location or at a different point than the individual conductor or conductors. This is of advantage in particular whenever the electrical contact points that correspond to the corresponding ends of the individual conductors lie below a liquid level (for instance of a wet rotor liquid). This is so because, if the channel element were likewise to end below the liquid level, a pressure equalization by way of the wiring harness would no longer be possible without liquid being transported through the channel element.

The invention also relates to an electrical assembly which has a wiring harness formed according to the description above. Features, advantages and advantageous refinements of the wiring harness according to embodiments of the invention should be regarded as features, advantages and advantageous refinements of the electrical assembly according to embodiments of the invention, and vice versa.

The electrical assembly may—merely by way of example—be formed as an electric machine or comprise the electric machine. The electric machine is in particular a traction machine of a motor vehicle or for a motor vehicle. Accordingly, in the installed position as intended and ready for use, the electrical assembly is an integral part of the motor vehicle, for example a drive assembly of the motor vehicle. The motor vehicle may be formed for example as a passenger car and/or as a truck, as a bus, as a crane etc. Use of the electrical assembly in other types of vehicle (water, air, rail vehicles etc.) is also conceivable.

The electrical assembly has a first electrical contact point and a second electrical contact point and also the wiring harness formed according to the description above. In this case, the first electrical contact point and the second electrical contact point are electrically connected to one another by way of the wiring harness, in particular by way of at least one individual conductor of the wiring harness, for transmitting electrical power. For this purpose, ends of the corresponding individual conductor and a respective one of the electrical contact points are connected to one another in an electrically conducting manner, for example are connected to one another by frictional or interlocking engagement and/or material bonding in such a way that electrical current can flow from the corresponding contact point into the corresponding individual conductor, or vice versa.

Furthermore, the electrical assembly has a first chamber, for example a first machine chamber, which is delimited by a wall element and in which the first electrical contact point is arranged. The second electrical contact point is in this case arranged outside the first chamber, in particular in another or second chamber.

The electrical assembly therefore has the wall element, which delimits at least the first chamber. In this case, formed through the wall element is a passage opening, which completely penetrates the wall element. The first chamber is formed as fluidically seal-tight beyond the passage opening, that is to say for example is fluidically sealed off from a region surrounding the first chamber.

The wiring harness is held by frictional or interlocking engagement and/or material bonding by way of the passage opening, in that the wiring harness is arranged as running through the passage opening. In this way the passage opening is fluidically sealed off by way of the wiring harness sheath, while the wiring harness is held in the passage opening. Furthermore, one of the connection ends of the wiring harness is arranged in the first chamber, whereas the other of the connection ends of the wiring harness is arranged outside the first chamber, for example in the further chamber. Because of the wiring harness being arranged through the passage opening, the first chamber and a region outside the first chamber, for example the further chamber, are fluidically connected to one another by way of the channel element for pressure equalization.

Because of the wiring harness held in the passage opening, the passage opening is blocked or sealed off against a fluid flowing through it. Nevertheless, the first chamber and the region outside the first chamber are fluidically connected to one another by way of the wiring harness, that is to say by way of the channel element.

When producing the electrical assembly, for example first at least the first chamber of the electrical assembly may be provided without a pressure equalizing element, the passage opening not being able to serve as such a pressure equalizing element during operation of the electrical assembly because, as intended, the passage opening is blocked against a fluid, that is to say air, flowing through it, in that the wiring harness is fitted in the passage opening. Nevertheless, because of the wiring harness, venting of the first chamber, that is to say the pressure equalization between the first chamber and the region lying outside the first chamber, is made possible, in that the fluid, for example the air, can flow through the channel element between the first chamber and the region lying outside the first chamber. In this way the electrical assembly can be produced particularly easily and/or involving little effort, because—apart from the wiring harness—no separate pressure equalizing element has to be produced. In this case, the wiring harness is suitable in particular as a retrofitting solution for retrofitting a pressure equalizing possibility for the first chamber.

Provided in a further refinement of the electrical assembly is a further, second chamber, for example a second machine chamber, in which the second electrical contact point is arranged and which is delimited by the wall element, so that the chambers are fluidically sealed off from one another by way of the wall element. In this case, the passage opening opens out on the one hand into the first chamber and on the other hand into the further or second chamber. Furthermore, the other of the connection ends of the wiring harness is arranged in the further or second chamber, so that the chambers are fluidically connected to one another by way of the channel element for pressure equalization. In this case, it is provided in particular that the two chambers are fluidically connected to one another only or exclusively by way of the wiring harness. In other words, the two chambers are fluidically sealed off from one another beyond the channel element or wiring harness.

The invention relates furthermore to a motor vehicle which is equipped with the wiring harness presented above or with the electrical assembly presented above. Features, advantages and advantageous refinements of the wiring harness according to embodiments of the invention and of the electrical assembly according to embodiments of the invention should be regarded as features, advantages and advantageous refinements of the motor vehicle according to embodiments of the invention, and vice versa.

Further features of the invention may emerge from the claims, the figures and the description of the figures. The features and combinations of features mentioned above in the description and the features and combinations of features shown in the description of the figures below and/or in the figures alone can be used not only in the respectively stated combination but also in other combinations or alone without departing from the scope of the invention.

DETAILED DESCRIPTION OF THE DRAWINGS

In the figures, elements that are the same or functionally the same are provided with the same designations.

Figure 1:
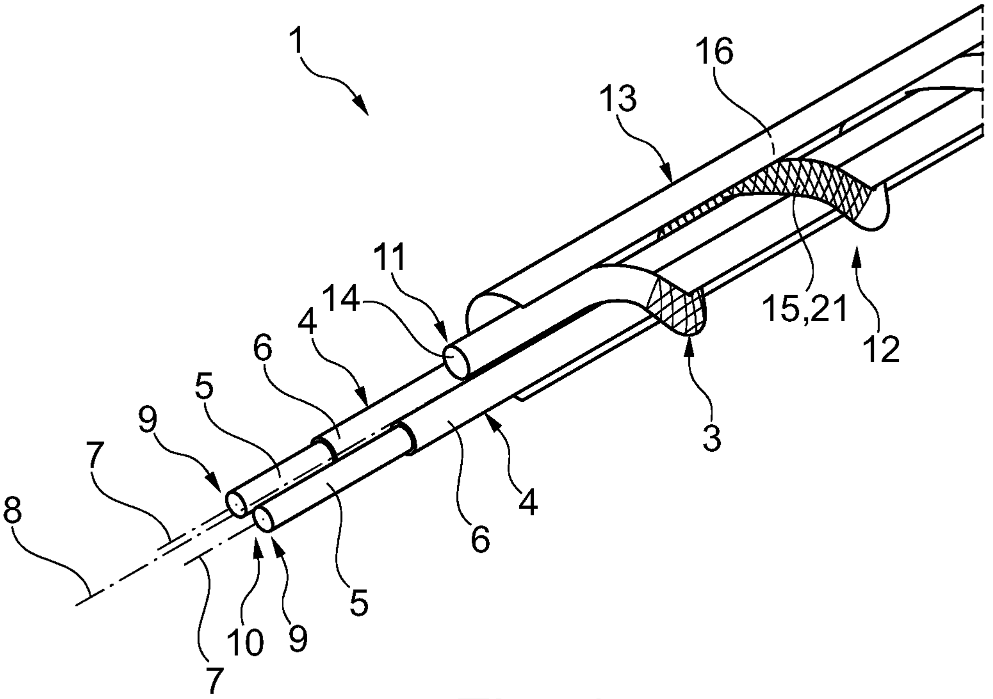
FIG. 1 shows a perspective and partially sectional view of a portion of a wiring harness which has a channel element.

A wiring harness 1 and an electrical assembly 2 are presented below in a joint description. For this purpose, FIG. 1 shows in a perspective and partially sectional view a portion of the wiring harness 1 which has a channel element 3. If the electrical assembly 2 (shown in part in FIG. 2) has been produced in such a way that it is ready for use, the electrical assembly 2 has the wiring harness 1. In this case, the wiring harness 1 is designed for transmitting electrical power, that is to say electrical voltage and/or electrical current, between two electrical contact points (not shown) arranged or formed separately from one another. For this purpose, the wiring harness 1 has an individual conductor 4, in the present example two individual conductors 4, which have a respective core 5 of an electrically conducting or electrically conductive material, for example metal. The wiring harness may have more than two individual conductors.

The respective individual conductor 4 comprises an electrically insulating layer 6, the respective core 5 and the respective electrically insulating layer 6 being connected to one another in such a way that a fluid, for example air, is blocked from passing through between the respective core 5 and the respective electrically insulating layer 6. In other words, the respective individual conductor 4 is formed as fluidically seal-tight along its longitudinal direction of extent 7. In the stretched state of the wiring harness 1, a longitudinal direction of extent 8 of the wiring harness 1 and the longitudinal direction of extent 7 of the individual conductor 4 coincide or are parallel to one another. A connection end 10 of the wiring harness 1 is formed by a respective end 9 of the respective individual conductor 4. In this case, the connection end 10 of the wiring harness 1 is designed to be brought into electrically conducting or conductive contact with the contact points, so that an electrically conducting or conductive connection is established between the wiring harness 1, in particular the corresponding individual conductor 4, and the corresponding contact point.

The channel element 3 is of a hollow form and runs along the longitudinal direction of extent 8 of the wiring harness 1, an open end 11 of the channel element 3 opening out at the connection end 10. Expressed a different way, the end 11 of the channel element 3 is arranged in the region, in particular the proximity, of the connection end 10. To this extent it should be understood that the connection end 10 is a region or space which encloses both the corresponding end 9 of the corresponding individual conductor 4 and the end 11 of the channel element 3.

Along the longitudinal direction of extent 8 of the wiring harness 1, the channel element 3 may be arranged parallel to the individual conductors 4. In the present example it is provided that the wiring harness 1 has a wrapping region 12, in which the channel element 3 wraps around at least one of the individual conductors 4 or a number of the individual conductors 4. In this case, the channel element 3 is arranged helically or like a helix, at least in the wrapping region 12, so that the individual conductor(s) 4 is/are wrapped around helically by the channel element 3.

The wiring harness 1 also has a wiring harness sheath 13, by way of which the individual conductors 4 and the channel element 3 are jointly sheathed along the longitudinal direction of extent 8. In the present example the individual conductors 4 and the channel element 3 are sheathed uninterruptedly along the longitudinal direction of extent by way of the wiring harness sheath 13. In FIG. 1, the wiring harness sheath 13 is only partially shown.

Being of a hollow form allows the channel element 3 to offer a pressure equalizing channel 14 which is free from material and can be flowed through by a fluid, in particular gas, for example air, and by way of which a pressure equalization can take place between the connection end 10 and a further connection end (not shown) opposite from or opposed to the connection end 10 along the longitudinal direction of extent 8.

It is shown furthermore in FIG. 1 that the individual conductors 4 project beyond the channel element 3 at the connection end 10 along the longitudinal direction of extent 7, 8. In other words, the respective individual conductor 4 extends further out of the wiring harness sheath 13 than the channel element 3 or the pressure equalizing channel 14.

In the present example the channel element 3 has an additional length portion 15, which serves the purpose of arranging the channel element 3 helically around the individual conductor(s) 4.

Also, not shown or shown completely transparently in FIG. 1 is an embedding body 16, which together with the individual conductor 4 or with the individual conductors 4 and the channel element 3 is enclosed on the outer circumferential side by the wiring harness sheath 13. In other words, both the embedding body 16 and the channel element 3 as well as the at least one individual conductor 4 are arranged inside the wiring harness sheath 13. In this case, a material-bonding connection may have been respectively produced between the embedding body 16 and the at least one individual conductor 4 and between the embedding body 16 and the channel element 3. Thus, the embedding body 16 acts on the one hand as a fastening or holding element for the channel element 3 and/or for the individual conductor 4 within the wiring harness sheath 13 and on the other hand as a sealing element by way of which the wiring harness 1 is formed as fluidically seal-tight along the longitudinal direction of extent 8.

Figure 2:
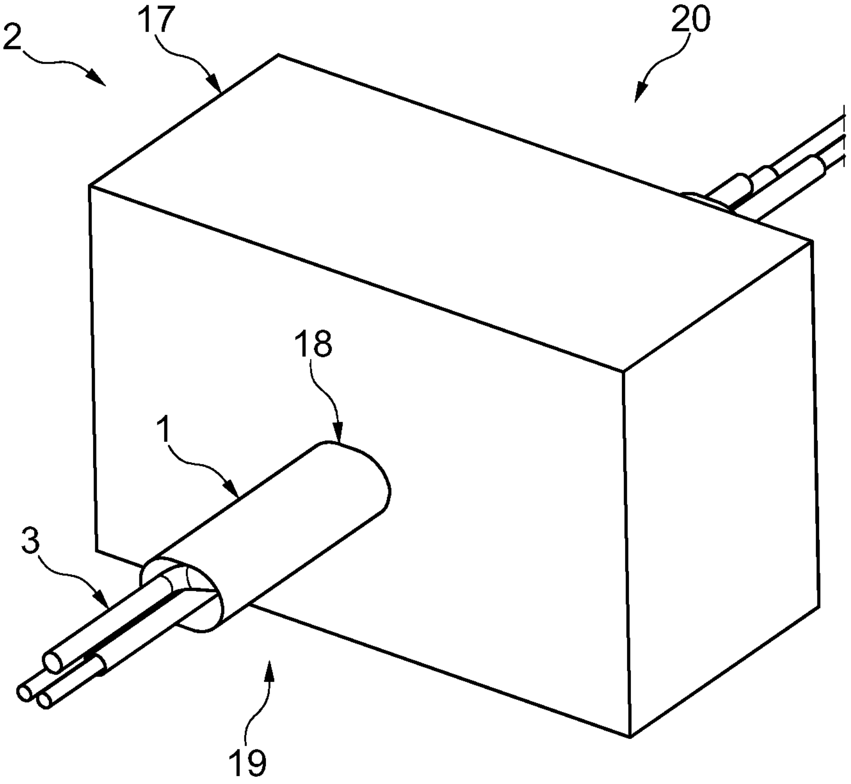
FIG. 2 shows a perspective view of a wall element of an electrical assembly which has a passage opening through which the wiring harness runs.

FIG. 2 shows a perspective view of a wall element 17 of the electrical assembly 2, the wall element 17 having a passage opening 18 through which the wiring harness 1 runs. The electrical assembly 2 has the first electrical contact point (not shown) and the second electrical contact point (not shown), which are electrically connected to one another by way of the wiring harness 1. Furthermore, the electrical assembly 2 has the wall element 17, which in the present example separates a first chamber 19 and a second chamber 20 from one another. To this extent, the electrical assembly 2 includes the chambers 19, 20. In this case, the first electrical contact point is arranged in the first chamber 19, whereas the second electrical contact point is arranged in the second chamber 20. The chambers 19, 20 are fluidically connected to one another by way of the passage opening 18 as long as the wiring harness 1 has not yet been inserted as intended into the passage opening 18. Apart from the passage opening 18, the chambers 19, 20 are fluidically sealed off from one another. In FIG. 2 it is shown how the wiring harness 1 runs through the passage opening 18 and extends—in each case at least partially—into the respective chamber 19, 20. Expressed in a different way, the wiring harness 1 ends on the one hand in the first chamber 19 and on the other hand outside the first chamber 19, in particular in the second chamber 20. Because of this, in this state the chambers 19, 20 are fluidically sealed off from one another—apart from the channel element 3. This should be understood as meaning that no fluid can flow through between the wiring harness 1, in particular between its wiring harness sheath 13, and the passage opening 18. However, because of the channel element 3, the two chambers 19, 20 are fluidically connected to one another, so that a pressure equalization can take place between the chambers 19, 20. In other words, because of the channel element 3, it is ensured that the respective chamber 19, 20 can be vented, in that fluid, in particular the air, flows through the channel element 3.

Figure 3:
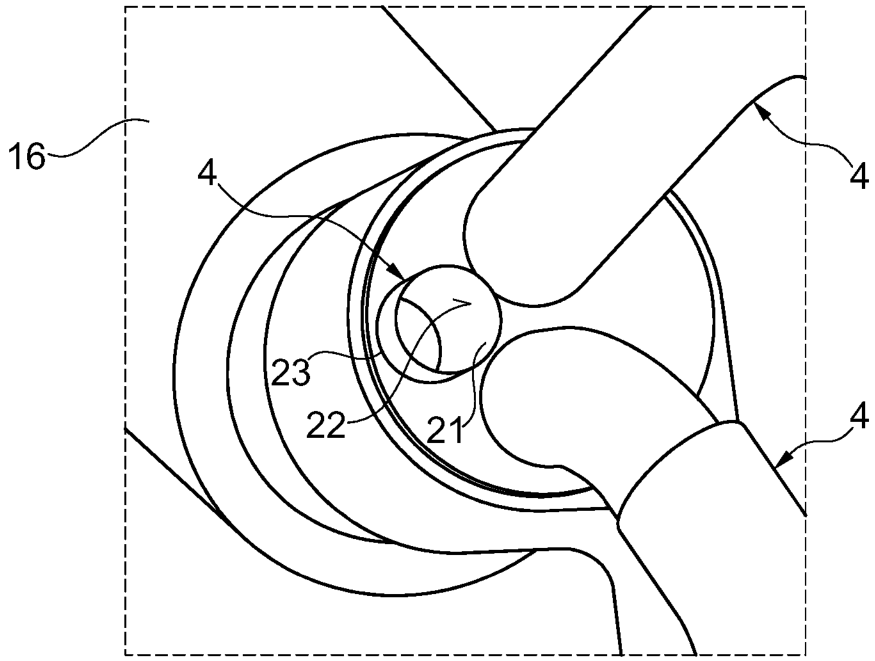
FIG. 3 shows a perspective and detailed view of a connection end of the wiring harness.

In FIG. 3 a perspective and detailed view of the connection end 10 of the wiring harness 1 is shown. To avoid dirt particles being undesirably transported from one of the chambers 19, 20 into the corresponding other one of the chambers 19, 20 during pressure equalization between the chambers 19, 20 by way of the channel element 3, in the present example it is provided that the wiring harness 1, in particular its channel element 3, has a dirt trapping device 21. The dirt trapping device 21 has for example a dirt trapping layer 22 arranged on the inner circumferential side of the channel element 3 and formed in particular like a hook tape of a hook-and-loop fastener and/or as magnetic or magnetizable. In this case, an inner circumferential surface of the channel element 3 or of the pressure equalizing channel 14 may be formed at least in some regions, for instance in a protective trapping region, by the dirt trapping device 21, in particular by the dirt trapping layer 22.

As an alternative or in addition, the dirt trapping device 21 has the additional length portion 15 (see FIG. 1), with the effect of providing a particularly long dirt trapping distance, along which any dirt particles can be deposited as intended.

Because of the dirt trapping device, (dirt) particles are not undesirably transported through the channel element 3—in particular during pressure equalization or because of the pressure equalization.

Furthermore, in the present example the wiring harness 1 has a form stability structure 23, by way of which the channel element 3, that is to say the pressure equalizing channel 14, is protected from excessive axial and radial deformation. In the present example, the form stability structure 23 is provided by the channel element 3 having a circular ring-shaped cross-sectional figure. Because of the circular ring-shaped cross-sectional figure, the channel element 3 is particularly resistant to bending and to radial deformation, that is to say crushing, so that the channel element 3, and as a consequence the pressure equalizing channel 14, is particularly stable. Furthermore, the form stability structure 23 may have a reinforcing structure which is incorporated—in particular in a material-bonding manner—in a material of the channel element 3. The reinforcing structure may be for example a wire framework or mesh.

In the present case, the individual conductors 4, their electrical insulating layer 6, the channel element 3, the wiring harness sheath 13, the embedding body 16 and the form stability structure 23 are elastically and/or plastically bendable or formable non-destructively along the longitudinal direction of extent 8 of the wiring harness 1. Therefore, bending or deforming of the wiring harness 1 in a way that does not constitute misuse does not cause any functions of the channel element 3 and the individual conductors 4 and of the embedding body 16 and the form stability structure 23 to be restricted.

Figure 4:
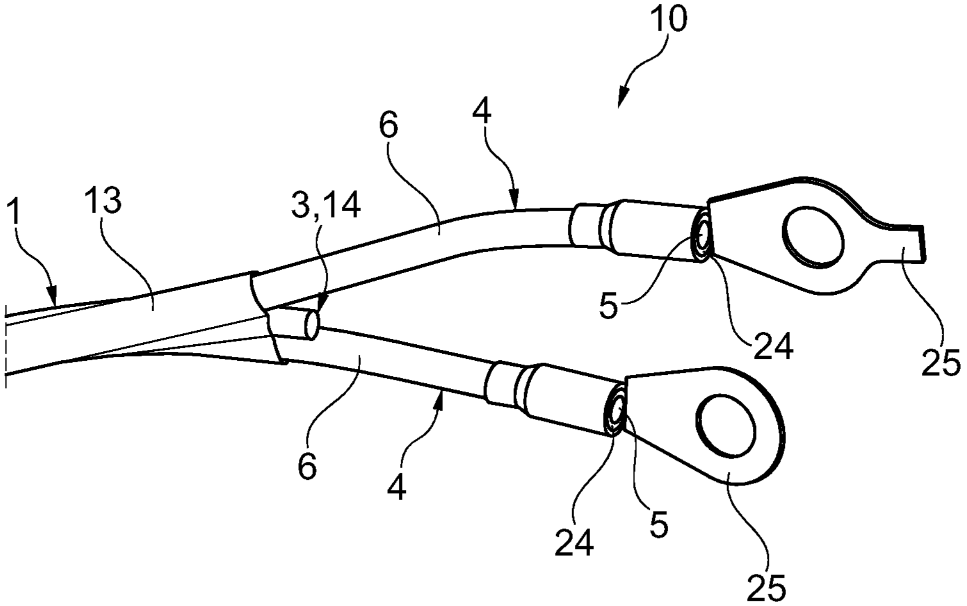
FIG. 4 shows a perspective view of the connection end.

In FIG. 4 a perspective view of the connection end 10 of the wiring harness 1 is shown. Here it can be seen in particular how the channel element 3 opens out in the region of the connection end 10 and in this case projects less far into the region than the individual conductors 4. It can also be seen that, for particularly easy and efficient contacting with the electrical contact points, the individual conductors 4 have a respective wire end sleeve 24, the respective wire end sleeve 24 being formed in one piece with a respective cable lug 25. Thus, such an intimate connection is established between the respective core 5 of the individual conductor 4 and the associated wire end sleeve 24 that it is not possible for fluid, in particular air, to flow through between the core 5 and the respective electrically insulating layer 6. For this purpose, it may for example be provided that a material-bonding connection is established between the corresponding wire end sleeve 24 and the corresponding core 5.

Overall, the wiring harness 1 and the electrical assembly 2 propose a possibility for efficient pressure equalization of the chamber 19, 20 or the chambers 19, 20 that involves particularly little effort. In other words, it is shown by the wiring harness 1 or by the electrical assembly how one of the chambers 19, 20 can be provided, in particular retrofitted, with a pressure equalizing element particularly efficiently and involving little effort.

LIST OF DESIGNATIONS

1 Wiring harness
2 Electrical assembly
3 Channel element
4 Individual conductor
5 Core
6 Electrically insulating layer
7 Longitudinal direction of extent of the individual conductor
8 Longitudinal direction of extent of the wiring harness
9 End of the individual conductor
10 Connection end
11 End of the channel element
12 Wrapping region
13 Wiring harness sheath
14 Pressure equalizing channel
15 Additional length portion
16 Embedding body
17 Wall element
18 Passage opening
19 Chamber
20 Chamber
21 Dirt trapping device
22 Dirt trapping layer
23 Form stability structure
24 Wire end sleeve
25 Cable lug

What is claimed is:

1. A wiring harness for an electrical assembly, wherein the wiring harness is configured to transmit electrical power between two electrical contact points arranged separately from one another, the wiring harness comprising:

an individual conductor, which comprises an electrically insulating layer and forms, along a longitudinal direction of extent of the wiring harness, two connection ends of the wiring harness for electrical contacting of the contact points;

a hollow channel element, which is formed separately from the individual conductor and runs along the longitudinal direction of extent, wherein a respective one of ends of the channel element opens out at a respective one of the connection ends; and a wiring harness sheath, by way of which the individual conductor and the channel element are jointly sheathed along the longitudinal direction of extent, wherein the channel element has a dirt trapping device.

2. The wiring harness according to claim 1, wherein:

the dirt trapping device has a dirt trapping layer arranged on an inner circumferential side of the channel element.

3. The wiring harness according to claim 1, wherein:

the channel element has an additional length portion, because of which the channel element is arranged as wrapping helically around the individual conductor in the wiring harness sheath, at least in a wrapping region.

4. The wiring harness according to claim 3, wherein:

the dirt trapping device has the additional length portion.

5. The wiring harness according to claim 1, further comprising:

an embedding body, which is arranged in the wiring harness sheath and in which the individual conductor and the channel element are embedded, whereby the wiring harness is fluidically seal-tight within the wiring harness sheath beyond the channel element along the longitudinal direction of extent.

6. The wiring harness according to claim 1, wherein:

the channel element has a form stability structure by way of which the channel element is protected from excessive axial and radial deformation.

7. The wiring harness according to claim 1, wherein:

the individual conductor projects beyond the channel element at the connection end along the longitudinal direction of extent.

8. An electrical assembly comprising:

a first electrical contact point and a second electrical contact point, which are electrically connected to one another by the wiring harness according to claim 1, a chamber, which is delimited by a wall element and in which the first electrical contact point is arranged, wherein the second electrical contact point is arranged outside the chamber; and a passage opening, which penetrates the wall element, wherein the chamber is formed as fluidically seal-tight beyond the passage opening; wherein:

the wiring harness runs through the passage opening, the passage opening is fluidically sealed off by the wiring harness sheath, while the wiring harness is held in the passage opening; and one of the connection ends is arranged in the chamber, whereas the other of the connection ends is arranged outside the chamber, so that the chamber and a region outside the chamber are fluidically connected to one another by the channel element for pressure equalization.

9. The electrical assembly according to claim 8, further comprising:

a further chamber, in which the second electrical contact point is arranged and which is delimited by the wall element, so that the chamber and the further chamber are fluidically sealed off from one another by the wall element, wherein:

the passage opening opens out on one hand into the chamber and on another hand into the further chamber; and the other of the connection ends is arranged in the further chamber, so that the chamber and the further chamber are fluidically connected to one another by the channel element for pressure equalization.

10. A wiring harness for an electrical assembly, wherein the wiring harness is configured to transmit electrical power between two electrical contact points arranged separately from one another, the wiring harness comprising:

an individual conductor, which comprises an electrically insulating layer and forms, along a longitudinal direction of extent of the wiring harness, two connection ends of the wiring harness for electrical contacting of the contact points;

a hollow channel element, which is formed separately from the individual conductor and runs along the longitudinal direction of extent, wherein a respective one of ends of the channel element opens out at a respective one of the connection ends;

a wiring harness sheath, by way of which the individual conductor and the channel element are jointly sheathed along the longitudinal direction of extent; and an embedding body, which is arranged in the wiring harness sheath and in which the individual conductor and the channel element are embedded, whereby the wiring harness is fluidically seal-tight within the wiring harness sheath beyond the channel element along the longitudinal direction of extent.

11. A wiring harness for an electrical assembly, wherein the wiring harness is configured to transmit electrical power between two electrical contact points arranged separately from one another, the wiring harness comprising:

an individual conductor, which comprises an electrically insulating layer and forms, along a longitudinal direction of extent of the wiring harness, two connection ends of the wiring harness for electrical contacting of the contact points;

a hollow channel element, which is formed separately from the individual conductor and runs along the longitudinal direction of extent, wherein a respective one of ends of the channel element opens out at a respective one of the connection ends; and a wiring harness sheath, by way of which the individual conductor and the channel element are jointly sheathed along the longitudinal direction of extent, wherein the channel element has a form stability structure by way of which the channel element is protected from excessive axial and radial deformation.

12. The wiring harness according to claim 2, wherein the dirt trapping layer is at least one of:

a magnetic and/or magnetizable material layer;

adhesively formed; or configured as a hook tape of a hook-and-loop fastener.

* * * * *